United States Patent [19]

Smith

[11] Patent Number: 4,554,412

[45] Date of Patent: Nov. 19, 1985

[54] RESISTIVE LINE CIRCUIT

[75] Inventor: Douglas C. Smith, Rumson, N.J.

[73] Assignee: AT&T Information Systems Inc., Holmdel, N.J.

[21] Appl. No.: 633,478

[22] Filed: Jul. 23, 1984

[51] Int. Cl.[4] .......................................... H04M 19/00
[52] U.S. Cl. .................................. 179/78 R; 179/70; 307/15
[58] Field of Search .......... 179/78 R, 70, 77, 170 NC, 179/16 AA, 16 F, 18 FA; 333/213, 214, 215, 216; 307/15, 30, 31, 38

[56] References Cited

U.S. PATENT DOCUMENTS

| | | | |
|---|---|---|---|
| 3,458,711 | 7/1969 | Calkin et al. ........................... | 307/36 |
| 3,581,104 | 5/1971 | Thew .................................... | 307/15 |
| 3,646,428 | 2/1972 | Torok .................................. | 323/22 T |
| 3,649,769 | 3/1972 | Pest ....................................... | 179/77 |
| 3,993,880 | 11/1976 | O'Neill ............................. | 179/170 D |
| 4,007,335 | 2/1977 | Hetherington et al. ........ | 179/16 AA |
| 4,087,647 | 5/1978 | Embree et al. ...................... | 179/77 |
| 4,194,091 | 3/1980 | Bosik .................................. | 179/77 |

Primary Examiner—Gene Z. Rubinson
Assistant Examiner—Elio Di Vito
Attorney, Agent, or Firm—David H. Tannenbaum

[57] ABSTRACT

Resistive battery feed circuits are normally not used because of lack of power supply noise rejection and attendant crosstalk coupling. In this circuit the opamp and surrounding circuitry insure that power supply and ground noise do not couple into the tip and ring circuits as a metallic signal and improve crosstalk attenuation. In addition, the opamp is used to split the 48 volt supply.

12 Claims, 2 Drawing Figures

BATTERY FEED CIRCUIT

FIG. 1  BATTERY FEED CIRCUIT

RESISTIVE LINE CIRCUIT

BACKGROUND OF THE INVENTION

This invention is related to telephone line circuits and more particularly to the reduction of power dissipation and the elimination of inductors in such circuits.

A telephone line circuit is interposed between the PBX line and the associated telephone station. These circuits serve, among other things, to provide both AC and DC power to activate the telephone transmitter and receiver. These circuits presently contain inductors which serve to isolate the DC power supply and to allow for the circuit's AC impedance to differ from the DC resistance. One major aim of circuit designers has been the elimination of the costly, and bulky, inductors from the line circuits, thereby making the circuits fully resistive.

Resistive line feed circuits, however, have not been popular in the past for several reasons, namely because they do not reject power supply noise. Any noise on the battery supply shows up as an audible signal in the telephone. A second problem is that ground potential noise can be heard as an audible signal. Another problem with resistive-only line circuits is that one port could crosstalk to others through the power supply internal impedance.

SUMMARY OF THE INVENTION

I have designed a simple, but efficient, resistive battery feed line circuit that saves power dissipation and is physically smaller than previous designs operating from −48 VDC. It places two resistives battery feed circuits in series between −48 v and ground, each circuit operating on 24 volts. Ground noise is fed to the ring lead of one circuit by a Darlington emitter follower to that circuit's tip lead and the other circuit's ring lead through a source follower and directly to the tip lead of the other circuit. As a result, the noise signals on all of the leads move in unison thereby eliminating noise problems. Crosstalk is prevented in the same way as noise immunity is achieved by an opamp and a Darlington power filter. The circuit saves power over conventional line circuits by recycling the line feed current between two line circuits.

BRIEF DESCRIPTION OF THE DRAWINGS

These and other objects and features, together with the operation and utilization of the present invention, will be more apparent from the illustrative embodiment shown in conjunction with the drawing in which.

DETAILED DESCRIPTION

Figure 1:
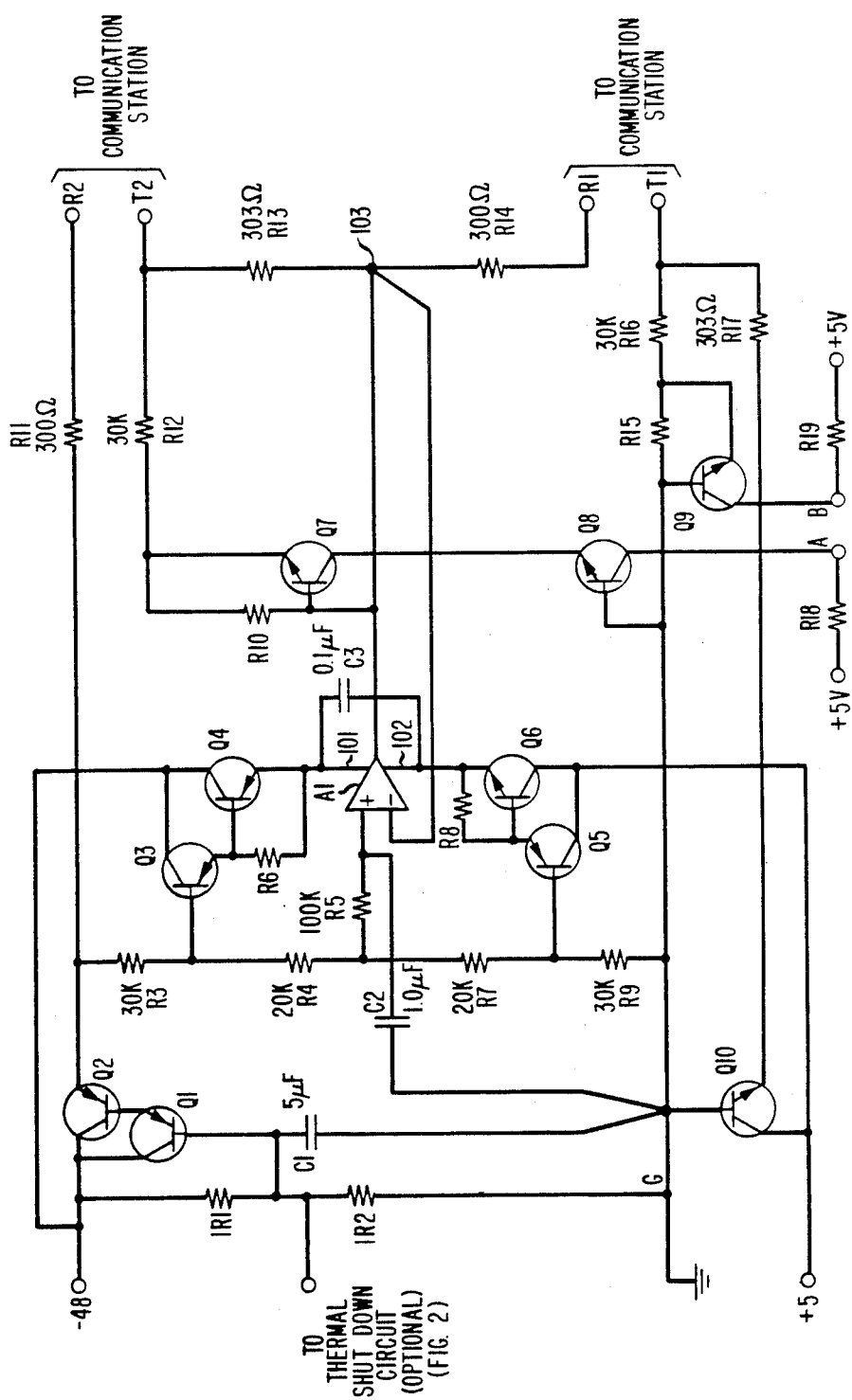
FIG. 1 is a schematic drawing showing my resistive battery feed circuit.

The circuit shown in FIG. 1 stacks two 24-volt resistive line feed circuits (R2, T2 and R1, T1) between ground and −48 volts. This results in two line circuits dissipating the same power as one of conventional design. Circuit T1, R1 operates between ground (lead T1) and −24 volts (lead R1) while circuit T2, R2 operates between −24 volts (T2 lead) and −48 volts (lead R2). Note that in both circuits the R− lead is the one most negative.

NOISE ELIMINATION

Ground noise is rejected in the following way. Any noise on ground, including audio voltages, is fed to ring 2 (R2) via capacitor C1, the Darlington emitter follower Q1, Q2 and resistor R11. These same ground noise signals are also fed to tip 2 (T2) via capacitor C2, the source follower amplifier A1 and resistor R13; to ring 1 (R1) via capacitor C2, source follower amplifier A1 and resistor R14; and to tip 1 (T1) via source follower Q10 and resistor R17. As a result, the ground noise signals appear as a common mode voltage on both tip/ring pairs, and accordingly, there is no differential voltage generated between the leads as a result of ground noise.

Power supply noise on the −48 volt lead is rejected by the Darlington filter circuit comprised of transistors Q1, Q2, and voltage divider resistors 1R1 and 1R2 and capacitor C1. Voltage divider resistors R1 and R2 establish a bias on the base of transistor Q1 while capacitor C1 filters the voltage to remove the AC noise component. The bias voltage should be selected so as to insure enough voltage drop across transistors Q1, Q2 to prevent their saturation by noise voltages riding on the −48 v power input. The resultant "quiet" bias voltage is delivered by the Darlington pair transistors Q1, Q2 to ring 2 (R2) via resistor R11. The voltage divider comprised of resistors R3, R4, R7 and R9 provides, at its midpoint, the −24 volt reference required for leads T2 and R1.

Power supply noise rejection for these leads is accomplished by the inherent power supply rejection of opamp A1. Since lead T1 is effectively grounded, power supply noise rejection is not a problem. This power supply noise rejection prevents other common mode or metallic noise signals from appearing on terminals T1-R1 or terminals T2-R2.

The Darlington transistors Q3, Q4, Q5 and Q6 feeding power to opamp A1 are used with voltage dividing resistors R3, R4, R7 and R9 so that only a fraction of the −48 volt source will appear across opamp A1. These transistors also function to reduce the power dissipation of opamp A1 because of the reduced voltage. This arrangement allows for the use of a low voltage opamp and could be eliminated if an opamp is used which can handle the −48 volt power directly.

CROSSTALK ELIMINATION

Digressing momentarily, it should be noted that transistor Q10 allows audio signal currents on tip 1 (T1) to flow via resistor R17 to the +5 volt supply lead while rejecting +5 v supply noise. Transistor Q10 could be eliminated and the emitter and collector leads connected directly to ground in which case the audio signal currents would flow on the ground lead. Such a situation, while possible in many situations, could cause crosstalk if circuits other than filtered battery feed circuits were to use the same ground.

Opamp A1 functions to provide a low impedance source of −24 v to the two circuits R1-T1 and R2-T2. Point 103, between terminals R1 and T2, is a low impedance point of −24 v that is used to provide a −24 v feed circuit to each of the communication stations via the associated battery feed resistors R14 and R13 in conjunction with battery feed resistors R17 and R11, respectively. Feedback for source follower opamp A1 to its negative input is taken from point 103 to insure that the wiring resistance from the output of opamp A1 to point 103 is within the feedback loop of opamp A1.

This insures that point 103 has a low AC impedance and remains at −24 v. Low impedance at point 103 prevents the introduction of signals on the T2 terminal from signals on the R1 terminal (or the reverse). These undesirable signals, crosstalk, could also be coupled through the common opamp if care was not taken. However, opamp A1's negative power return, lead 101, is directly returned to −48 v via Darlington Q3, Q4 so as to prevent crosstalk between the circuits. Since opamp lead 101 carries audio signal current from the R1, T1 circuit, if this current were allowed to flow into the emitter of the Darlington power filter Q1, Q2, excessive crosstalk could result because of the emitter resistance of the Darlington pair. By returning the opamp power directly to −48 v any resultant signal voltage on the −48 v lead is filtered out by the Darlington power filter, as discussed above, before reaching the feed circuit, T2, R2.

LOOP CURRENT DETECTION

Loop current flowing between terminals T2 and R2 (or T1 and R1) is sensed by ground (low) appearing on leads A (or B) respectively. This occurs since current flowing between terminals T2 and R2, which signifies the off-hook condition of the communication station, generates a voltage across resistor R13 which, in turn, causes transistor Q7 to conduct. Resistors R10 and R12 determine the sensitivity of the circuit. The collector current of transistor Q7 drives transistor Q8 which provides the ground signal on lead A. Transistor Q8 is necessary because T2-R2 is at a potential below ground, i.e., −24 v to −48 v. Circuit R1, T1 uses only one transistor Q9 since that circuit operates between ground potential and −24 v.

The component values shown are for illustration purposes only and any other values may be used depending upon circuit sensitivity and requirements. Also, it should be noted that, while Darlington pairs are shown, other circuit configurations, such as superbeta pairs, or high gain transistors, or field effect transistors, may be substituted.

THERMAL PROTECTION

Figure 2:
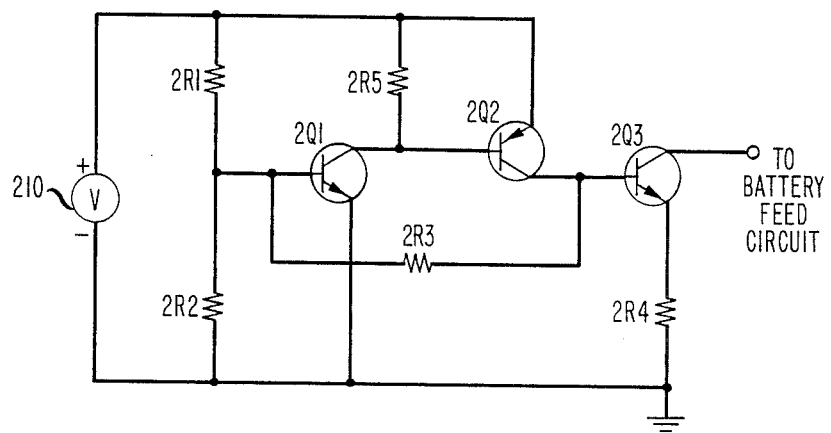
FIG. 2 shows a thermal shutdown circuit.

FIG. 2 shows the thermal shutdown circuit which may be used to inhibit chip power when the temperature of the chip reaches a first temperature threshold. The inhibit is maintained until the temperature of the chip decreases to a second predetermined temperature. In this manner, thermal hysteresis allows the circuit to cool sufficiently before restoring it to service.

Referring to FIG. 2, bias voltage 210 with resistors 2R1 and 2R2 establish a voltage at the base of transistor 2Q1 sufficiently below the base-to-emitter junction voltage of transistor 2Q1 to hold transistor 2Q1 in the nonconducting state. In turn, transistors 2Q1 and 2Q2 in the nonconducting state prevent transistor 2Q3 from conducting. It is well known in the art that the base-to-emitter junction voltage of a transistor decreases at a rate of approximately 2 millivolts per each degree centigrade rise in temperature. Thus, as the temperature of the illustrated circuit rises, the base-to-emitter junction voltage of transistor 2Q1 decreases. Resistors 2R1 and 2R2 are selected to establish a bias voltage across the base-to-emitter junction of transistor 2Q1 such that transistor 2Q1 starts to conduct when the temperature of the circuit is at approximately 150 degrees centigrade.

Transistor 2Q1, entering the conducting state, allows transistor 2Q2 to conduct which supplies additional forward bias current to the base of transistor 2Q1 via resistor 2R3 thereby driving transistor 2Q1 further into conduction. Transistor 2Q2 in the conducting state also permits transistor 2Q3 to conduct when applies an inhibit signal to the output which is applied between resistors R1 and R2 (FIG. 1) thereby removing power from the battery feed circuit.

The current supplied by transistor 2Q2 to the base of transistor 2Q1 via resistor 2R3 raises the bias voltage applied to the base-to-emitter junction of transistor 2Q1. Thus, transistors 2Q1, 2Q2 and 2Q3 remain in the conducting state when the temperature of the circuit starts to cool. In this manner, the values of resistors 2R1, 2R2 and 2R3 are selected so that the base-to-emitter junction voltage of transistor 2Q1 equals the bias voltage at a second or lower predetermined temperature at which transistors 2Q1, 2Q2 and 2Q3 start to turn off thereby disabling the inhibit applied to the battery feed circuit (FIG. 1) by transistor 2Q3.

What is claimed is:

1. A battery feed system for supplying power to a pair of communication circuits, each circuit having a pair of output conductors, said system comprising means for placing two 24-volt inductorless battery feed circuits in series between a −48 v power supply input and ground so that current is supplied to said communication circuits over said output conductors through resistive elements in each said battery feed circuit, means, common for both battery feed circuits, for eliminating differential interference signals on said output conductor pairs due to interference signals on said ground, means, common to both battery feed circuits, for eliminating both differential and common mode interference signals on said output conductor pairs due to interference signals on said −48 v power supply input, and means including both said ground interference signal eliminating means and said −48 v power supply input interference signal eliminating means and including a low impedance node between certain of said resistive elements of each said battery feed circuit for eliminating crosstalk between said conductor pairs.

2. The invention set forth in claim 1 further comprising an opamp common to said −48 v power supply interference elimination means, to said ground interference signal elimination means and to said crosstalk elimination means the output of said opamp providing to said low impedance node a filtered constant 24-volts.

3. The invention set forth in claim 2 wherein said power supply interference elimination means further includes a resistive voltage divider circuit coupled to a Darlington transistor pair.

4. The invention set forth in claim 1 wherein said ground interference signal elimination means includes means for coupling said ground signals to all of said output conductors concurrently.

5. The invention set forth in claim 1 wherein said circuit comprises means for detecting direct current flowing between the conductors of each said output conductor pair.

6. A battery feed circuit operable for providing power to a pair of communication circuits, said power being provided from a voltage v with reference to ground, said battery feed circuit comprising means for dividing said voltage v into a first voltage measured from ground to v/2 and into a second voltage measured from v/2 to v, a pair of terminals associated with each of said communication circuits, each said pair of terminals arranged to provide said power to said associated circuit, and means for maintaining each of said circuits free of voltage noise interference with respect to said ground, said means including the provision of any said ground voltage noise interference to all of said terminals concurrently thereby eliminating differential voltage potentials on said terminals caused by said ground voltage noise.

7. The invention set forth in claim 6 further comprising means for maintaining each of said communication circuits free of voltage noise interference with respect to said voltage v, said means including means for filtering said voltage v and for dividing said filtered voltage v into said voltage v/2, and means, including a single opamp, for extending said voltage v/2 to a low impedance node common to one terminal of each of said pair of terminals, said opamp having its power lead connected to said voltage v so as to prevent crosstalk between said communication circuits.

8. The invention set forth in claim 7 wherein said opamp has one of its inputs connected directly to said low impedance node.

9. The invention set forth in claim 8 wherein said circuit comprises means for detecting direct current flowing between each said pair of terminals.

10. A battery feed line circuit comprising a terminal for accepting a voltage potential, a terminal for accepting a ground potential, a first pair of terminals for supplying a voltage potential of v/2, a second pair of terminals for supplying a voltage potential of v/2, means, including a first capacitor, a transistor Darlington pair, and a resistor for connecting noise signals on said ground potential to the more negative of the two terminals of said second pair of terminals, means, including a second capacitor, a common opamp and a resistor individual to each pair of terminals for connecting noise signals on said ground potential to the more positive of the two terminals of said second pair of terminals and to the more negative terminal of said two terminals of said first pair of terminals, means including a resistor for connecting said ground potential and its noise signals to the more positive terminal of said two terminals of said first pair of terminals, means, including a first resistive divider connected between said voltage potential terminal and said ground potential terminal and including said Darlington pair of transistors, for filtering said voltage potential on said voltage potential terminal, means, including a second resistive divider connected between the emitter of said Darlington transistor pair and said ground potential terminal and including said common opamp for supplying an output voltage potential to said terminal pairs, said output voltage being negative with respect to the voltage supplied to said more positive terminal of said first pair of terminals, and being positive with respect to the voltage supplied to said negative terminal of said second pair of terminals, and isolation means connected to the power supply leads of said opamp for preventing crosstalk between said first and second pair of terminals.

11. The invention set forth in claim 10 wherein said isolation means includes a connection from a first power supply of said common opamp to said voltage potential terminal and from a second power supply input of said common opamp to said ground potential terminal.

12. The invention set forth in claim 10 wherein said circuit comprises mean for detecting direct current flowing between said first pair of terminals and between said second pair of terminals.

* * * * *